United States Patent [19]

Thomas et al.

[11] Patent Number: 4,959,241
[45] Date of Patent: Sep. 25, 1990

[54] SURFACING METHOD

[75] Inventors: Wayne M. Thomas; Edward D. Nicholas, both of Suffolk, England

[73] Assignee: The Welding Institute, Cambridge, England

[21] Appl. No.: 335,820

[22] Filed: Apr. 10, 1989

[30] Foreign Application Priority Data

Apr. 11, 1988 [GB] United Kingdom ............... 8808479

[51] Int. Cl.[5] .............................................. B05D 1/40
[52] U.S. Cl. ........................................ 427/11; 118/76;
118/200; 118/210; 118/211; 118/218; 118/255;
118/256; 188/731
[58] Field of Search ................ 427/11; 188/73.1;
118/76, 200, 210, 211, 218, 255, 256

[56] References Cited

U.S. PATENT DOCUMENTS

| 3,436,248 | 4/1969 | Dittrich et al. | 427/423 |
| 3,553,007 | 1/1971 | Hennig | 427/11 |
| 4,183,137 | 1/1980 | Tomerson | 427/11 |
| 4,625,401 | 12/1986 | Cvijanovich | 427/11 |

FOREIGN PATENT DOCUMENTS

| 3601509 | 9/1986 | Fed. Rep. of Germany . | |
| 1425227 | 7/1965 | France . | |
| 2469241 | 2/1979 | France . | |
| 8704957 | 8/1987 | PCT Int'l Appl. . | |
| 119752 | 2/1959 | U.S.S.R. | 427/11 |
| 1268227 | 3/1972 | United Kingdom | 427/11 |

Primary Examiner—Stanley Silverman
Attorney, Agent, or Firm—Martin Novack

[57] ABSTRACT

A method of providing a material, typically a metal, surface on a substrate (1), comprises applying a consumable member (4) to the substrate (1) under pressure. The member (4) and substrate (1) are moved relative to one another along an arcuate path. Heat is generated at the interface between the member and the substrate so that material is laid down on the substrate along the path. The movement of the metal member (4) typically includes one or more cyclic components.

34 Claims, 3 Drawing Sheets

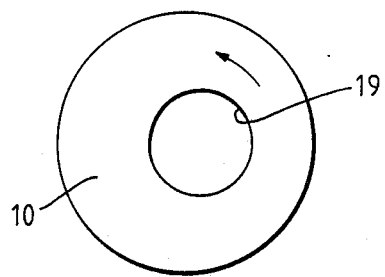
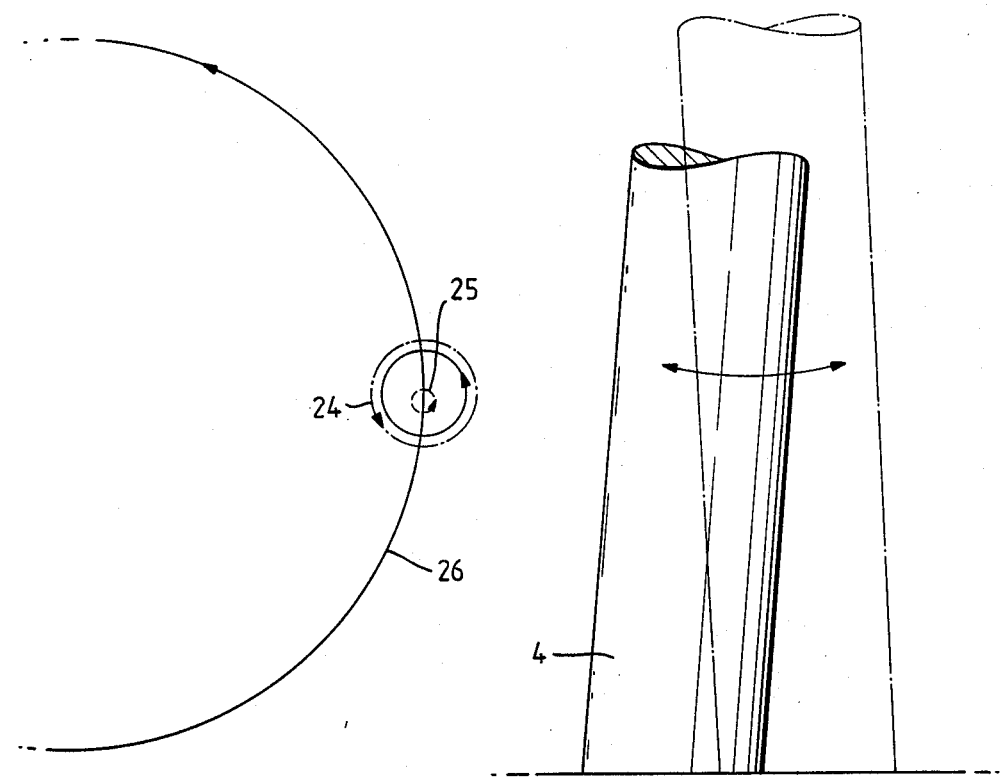

SURFACING METHOD

FIELD OF THE INVENTION

The invention relates to methods for providing a material surface on a substrate.

DESCRIPTION OF THE PRIOR ART

There are many techniques for applying a material, particularly a metal, to a base substrate, such as in arc welding by surfacing with a covered electrode or utilising a consumable electrode wire or even a strip electrode in an appropriate flux or gas shield. Also methods of spray coating with metallic powders or non-metallic materials such as carbides have been utilised.

One application in which it is desirable to produce a composite product is the production of discs for use with caliper brakes and the like. In the past, this has been achieved using flame spraying techniques but the adhesion achieved with these techniques is generally low, in the order of 2 tons/square inch with a consequent low lifetime for the discs.

SUMMARY OF THE INVENTION

In accordance with one aspect of the present invention, a method of providing a material surface on a substrate comprises applying a consumable member to the substrate under pressure; moving the member and substrate relative to one another along a path and generating heat at the interface between the member and the substrate so that material is laid down on the substrate along the path, and is characterised in that the member comprises an outer body which contains an insert of a different material which is laid down onto the substrate.

The invention is based on a technique known as "friction surfacing" which was originally proposed in GB-A-572,789 and we have developed this technique to a form in which it can be commercially applied.

In the past, the consumable member has been provided by a solid metal bar or rod. However, this has restricted the materials which can be laid down to those which can be formed into such a solid member.

In this case, the material may be provided by a consumable bar containing an insert of further dissimilar material which may be a solid rod or may comprise a coarse powder or granules. For this the main consumable bar would carry a further insert or inserts of the desired additional material to provide a composite inlay or layer. This is particularly advantageous when the inlay or layer comprises material which cannot be fabricated or extruded in suitable bar form for friction surfacing. For example, carbide powders may be added to an alloy steel bar to provide an alloy inlay or layer with a dispersion of carbide particles in addition. In particular, powders can be added to a consumable which carries a hollow channel which may be concentric with but preferably eccentric to its axis.

In the case of powders, preferably the powder material is one of or a mixture of one or more of tungsten, cobalt, molybdenum, manganese, titanium, chromium, vanadium, copper, nickel, metal oxides such as aluminium oxide or zirconium oxide and silicon, ceramics, silicon carbides and silicon nitrides.

We have also modified the conventional technique in accordance with a second aspect of the present invention to provide a material surface on a planar surface of a substrate, the method comprising applying a consumable material member to the surface of the substrate under pressure; moving the member and substrate relative to one another along a path in the plane of the surface of the substrate and generating heat at the interface between the member and the substrate so that material is laid down on the substrate along the path, characterised in that the path is arcuate. The path may or may not be closed.

The use of this technique enables much greater adhesive strengths to be achieved. Typically, break-up of the surfaced substrate is limited only by the inherent strength of the weaker material, usually the substrate. For example, in the case of brake discs mentioned above, adhesions of up to 30 tons/square inch can be obtained. Furthermore, the technique can be applied to a variety of dissimilar pairs of metals allowing the possibility for conventional products (such as brake discs) to be made from non-standard materials with the possibility of considerably enhanced lifetimes. This has the advantage of allowing materials to be used which would otherwise be metallurgically incompatible with the substrate and also the advantage of providing a layer with a high degree of adherence which is inherently homogeneous and of good mechanical strength unlike sprayed coatings. A further advantage is that the deposition process can be fully mechanised and that no skill is required and the metallurgical properties are consistently obtained.

The only significant commercial application for friction surfacing has been in providing a hard facing on cutting edges and the like as is described for example in WO-A-87/04957. However, in all previous methods the path along which the metal has been laid has had a rectilinear form. The method in accordance with the second aspect of the present invention significantly differs from this in providing an arcuate path in a planar surface and hence is particularly suitable for brake disc applications. Typically, the method according to the second aspect of the invention utilises friction surfacing in which a consumable bar, rod or tube, of the appropriate composition is rotated and pressed against the substrate while at the same time being traversed about an arcuate, typically circular, path relative to the substrate such that a thin layer of the consumable is deposited on the substrate. The invention can readily be applied for example to the manufacture of discs for disc brake systems where additional material can be applied, preferably simultaneously on both sides, to the disc substrate to produce an adhering layer of a suitable hardwearing material onto the substrate. The adhered layer can then be machined to a suitable profile and being of superior hardwearing properties to the base will allow longer life and/or more arduous duty than with the base material alone. The coating has the further advantages of being a solid phase deposit (unlike fusion cladding) and is inherently, metallurgically bonded to the substrate (unlike spray coatings).

In the case of brake discs the substrate may be a carbon steel which is readily machined or cast and may contain an inlay groove. The sides of the inlay are preferably chamferred to allow a smooth transition between the inlaid material and the parent substrate. To manufacture such a composite disc for use in a disc brake system the parent material is first machined to a suitable profile which is either flat or includes a channel which is preferably chamfered to take the appropriate inlay. The inlay is provided by a consumable bar of, for example, tool steel or other suitable alloy which is rotated and applied to the disc substrate and relative movement maintained between the disc and the axis of the consumable bar such that a layer of deposited material is created in the recess. Normally, sufficient material is deposited in one revolution of the disc substrate, but if required more than one revolution can be continuously maintained to build up a thicker and/or wider inlay. The inlay is subsequently machined to provide a smooth profile for the brake shoes either flush with or projecting above the substrate. Alternatively a series of annular inlays may be utilised. Again the deposited material may be left proud of the substrate with or without a channel, and contain machined grooves to facilitate cooling and/or gas flow when the brake disc is in use. As a further alternative, the deposit may be caused to have a textured surface which offers advantages when braking in wet conditions.

The inlay may be applied on each side of the disc in turn or preferably on both sides simultaneously with a specially adapted twin-headed friction surfacing machine. The latter has the advantage of counter-balancing the end thrust required for the consumable bar, as well as reducing the tendency to distortion of the disc in its own plane and increasing productivity. The disc can be rotated about its own centre axis, either by rotating its supporting shaft via an appropriate key or spline connection, or alternatively it may be rotated by a drive applied to the outer edge of the disc, such as by a knurled pinion wheel or alternatively a pinion with a suitable tooth profile mating with a corresponding profile in the disc. Moreover a multi headed friction surfacing machine may be utilised, such as with 3 pairs of opposing heads set at nominally 120° around the axis of the disc. Conveniently the drive to the disc may be coupled to the drive to the rotating consumable to give a controlled rate of deposition along the desired track. The disc may also carry vanes or other means for increasing air turbulence and hence cooling in use.

Typically, the step of generating heat at the interface between the member and the substrate comprises imparting a cyclic motion to the consumable member. Conveniently, the member is rotated. However, in some preferred arrangements leading to improved surfacing the cyclic motion may include a further cyclic component superimposed on the rotary component.

Thus, in accordance with a third aspect of the present invention, a method of providing a material surface on a substrate comprises applying a consumable member to the substrate under pressure; moving the member and substrate relative to one another along a path and generating heat at the interface between the member and the substrate so that material is laid down on the substrate along the path, and is characterised in that the step of generating heat at the interface between the member and the substrate comprises imparting a cyclic motion to the consumable member, the cyclic motion including a rotary component and a further cyclic component superimposed on the rotary component.

The further cyclic component may comprise one or more of an orbital, to and fro arcuate, and to and fro linear movement.

It is particularly preferred if the cylic movement of the consumable metal member is in the same sense as movement of the substrate.

The consumable may be conveniently fed forward via a controlled hydraulic ram or mechanically actuated jack together with appropriate means for rotation (for example at 300–700 rpm for a 25 mm diameter rod).

This can fill a channel of nominally 1 to 1½ mm depth, 23 mm width with side chamfers of nominally 45° slope giving an overall width of 25 to 26 mm. In friction surfacing some excess material is formed at the sides of the deposit which can be subsequently machined off to leave a smooth profile.

BRIEF DESCRIPTION OF THE DRAWINGS

Some examples of a method and apparatus for carrying out a method according to the invention will now be described with reference to the accompanying drawings, in which:

FIG. 4 illustrates the bush of FIG. 3;

FIG. 5 illustrates the motions involved in the FIG. 3 apparatus; and,

FIG. 6 illustrates the orbital motion of the consummable bar.

DETAILED DESCRIPTION OF THE EMBODIMENTS

Figure 1:
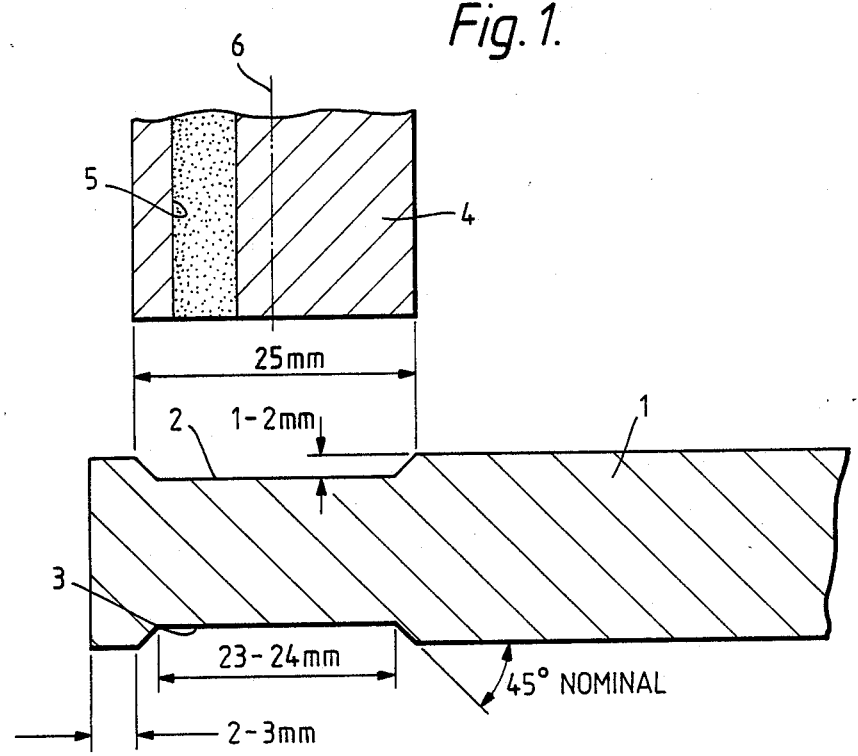
FIG. 1 is a partial, schematic cross-section through a brake disc prior to surfacing.

FIG. 1 illustrates part of a disc-shaped substrate 1 of cast-steel with a pair of annular recesses 2, 3 provided adjacent its periphery on opposite sides. Each recess has a depth of between 1 and 2 mm and chamferred sides extending at nominally 45° to the main surfaces of the substrate 1. A consumable bar 4 of H 13 specification viz: C 0.40, Si 1.0, Cr 5.25, Mo 1.4 and V 1.0, is aligned with the recess 2. The bar 4 has an outer diameter of about 25 mm and a bore 5, filled with a suitable powdered metal such as tungsten or cobalt. Alternatively a non-metal powder such as a carbide or nitride could be applied. The bore 5 is radially offset from the central axis 6 of the bar.

Figure 2:
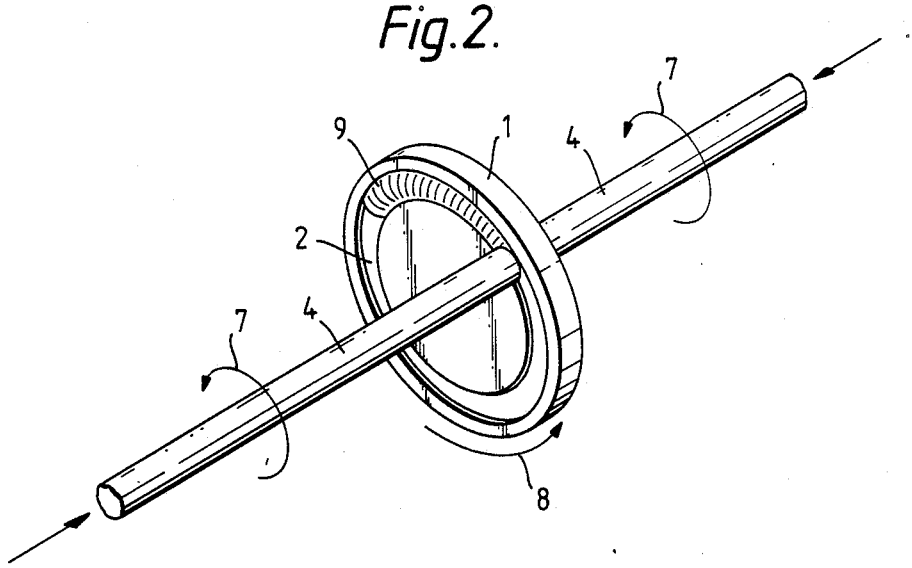
FIG. 2 is a diagram illustrating one example of the friction surfacing process.

As shown in FIG. 2, the disc 1 is mounted between a pair of the bars 4 each of which is mounted in a respective friction surfacing machine (not shown) of conventional form. Each friction surfacing machine rotates the corresponding bar 4 in the direction of arrows 7 while urging the bars 4, which are axially aligned, against respective faces of the disc 1. The disc 1 is mounted to a rotating device (not shown) which rotates the disc in the direction of an arrow 8 and it will be noted that this is the same direction as that in which the bars 4 are rotated.

In operation, the consumable bar 4 is brought into contact with the recess 2 of the substrate 1 under an axial load of 30–50 kN, preferably about 40 kN. The bar 4 is rotated about its own axis at between 300 and 600 rpm, preferably about 550 rpm and the substrate 1 is rotated about its axis so that the annular recess 2 moves beneath the bar 4 at a travel speed of 3–7 mm/second preferably about 4 mm/second. The rotation of the consumable bar 4 and the axial load under which the bar is urged against the substrate 1 causes heat to be generated at the interface and hence metal from the bar (including the powder in the bore (5) to be metallurgically bonded within the recess 2 as shown at 9.

To avoid excess oxidation or contamination for some inlay materials, a suitable protective atmosphere of inert gas (such as argon) or a normally non-reactive gas (such as nitrogen) or carbon dioxide may be provided in the vicinity of the abutting substrate and rotating consumable rod.

Other suitable materials to be laid down may be selected from the well known wear resistant and hardfacing alloys such as the Cobalt based or nickel based alloys, iron based alloys containing tungsten and/or molybdenum. The operating parameters (for a 25 mm diameter bar) fall generally within the ranges given above, with in particular higher axial loads and lower rotational speeds for materials of higher hot strength. Thinner layers are successfully deposited by increasing the travel speed of the substrate with respect to the axis of the consumable bar, and by increasing the rotational speed of the bar itself.

Deposits may be laid in prepared channels or recesses as close as 5 mm from the outer edge of the disc, and even as close as 3 mm from the outer edge. Moreover the deposit may be allowed to overlap the outer periphery by positioning the rotating bar such that its outer edge nominally coincides with the edge of the disc substrate.

Figure 3:
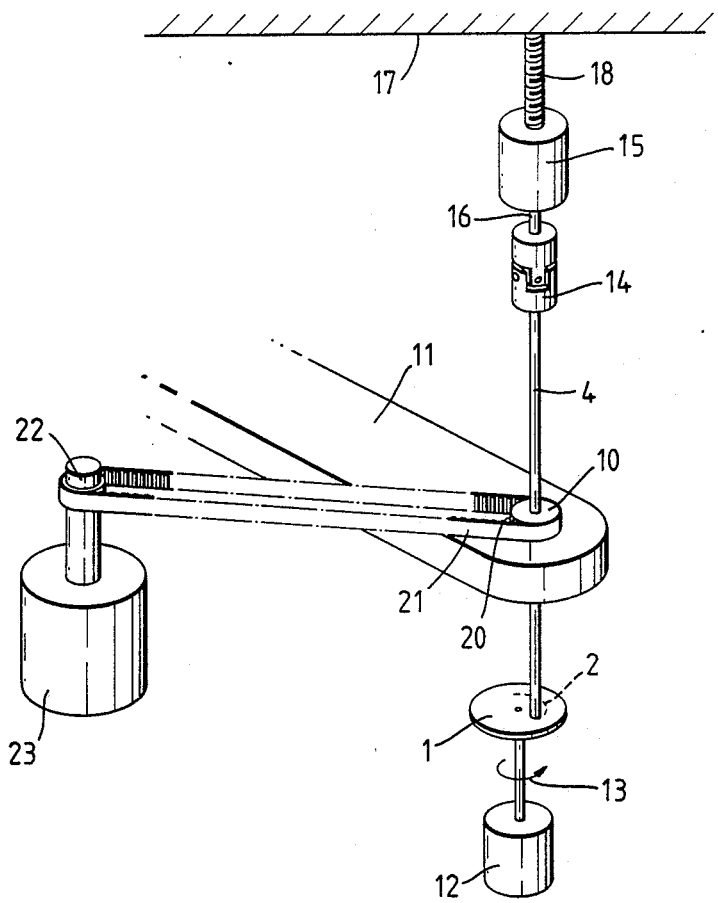
FIG. 3 illustrates apparatus for carrying out a second example of the process.

FIG. 3 illustrates one form of the apparatus which can be used to provide a metal surface on a disc 1. In this case, the consummable bar 4 is rotatably mounted within a bush 10 which is itself rotatably supported by bearings (not shown) in a support 11. The bar 4 extends through the support 11 and its remote end engages a surface of the disc 1. A motor 12 mounted on a base frame (not shown) rotates the disc 1 in the direction of the arrow 13.

The upper end of the consummable bar 4 is fixed within a universal joint 14 of conventional form which allows the consummable bar 4 to swing in the manner to be described below. The universal joint 14 is itself rotated by a spindle drive motor 15 to which the universal joint 14 is coupled via a connecting rod 16 received in a chuck (not shown) of the spindle motor 15 so as to impart rotational movement on the consummable bar 4. The spindle motor 15 is supported under a frame 17 by a conventional screw feed member 18 so that upon rotation of the connecting rod 16 and hence the consummable bar 4, the assembly moves downwardly so as to urge the consummable bar 4 against the disc 1. Various alternatives to the screw feed may be employed such as a rack and pinion feed or a hydraulic/pneumatic feed system.

As can be seen in FIG. 4, the bush 10 has a circular bore 19 with an axis offset by 1 to 2 mm from the central axis of the bush. The consummable bar 4 extends through the bore 19 within which it is rotated. The bush 10 has a toothed extension 20 around which is entrained a toothed drive belt 21, the other end of the drive belt extending around a drive spindle 22 coupled with a drive motor 23. Due to the offset between the axes of the bush 10 and the bore 19, rotation of the bush 10 will cause the bore 19 and hence the consummable bar 4 to orbit around the axis of the bush. This orbital motion of the bar 4 is schematically illustrated in FIG. 6.

FIG. 5 illustrates the three motions involved during operation of the FIG. 3 apparatus. Firstly, the bar 4 is rotated about its own axis by the spindle motor 15 as indicated by the arrow 24 (typically of 500 rpm). Secondly, the bar 4 orbits about the axis of the bush 10 upon rotation of the bush by the motor 23, as indicated by the arrow 25 (typically at 800 rpm). Thirdly, the disc 1 is rotated by the motor 12 so that the bar 4 effectively traces along the path 2 as shown by the arrow 26.

The speeds at which these motions are performed will generally be determined empirically but in general the orbital motion imparted by the motor 23 and the rotation of the bar 4 imparted by the motor 15 will be at different angular velocities.

We claim:

1. A method of providing a material surface on a substrate, the method comprising applying a consumable member to said substrate under pressure; moving said member and substrate relative to one another along a path and generating heat at the interface between said member and said substrate so that material is laid down on said substrate along said path, wherein said member comprises an outer body of a first material which contains an insert of a second material different from said first material which is laid down onto said substrate.

2. A method according to claim 1, wherein said path is arcuate.

3. A method according to claim 1, wherein said insert is a powder material.

4. A method according to claim 3, wherein said powder material is selected from one or more of the group consisting of tungsten, cobalt, molybdenum, manganese, titanium, chromium, vanadium, copper, nickel, metal oxides and silicon, ceramics, silicon carbides and silicon nitrides.

5. A method according to claim 1, wherein said outer body defines an axis, and wherein said insert is radially offset from said axis of said outer body.

6. A method of providing a material surface on a planar surface of a brake disk, the method comprising applying a consumable material member to said surface of said brake disc under pressure; moving said member and said brake disc relative to one another along a path in the plane of said surface of said brake disc and generating heat at the interface between said member and said brake disc so that material is laid down on said brake disc along said path, wherein said path is arcuate.

7. A method according to claim 6, wherein said member comprises an outer body of a first material which contains an insert of a second material different from the first material which is laid down onto said disc brake.

8. A method according to claim 1, wherein the step of generating heat at said interface between said member and said substrate comprises imparting a cyclic motion to said consumable member.

9. A method according to claim 8, wherein said cyclic motion includes a rotary component.

10. A method according to claim 9, wherein said cyclic motion includes a further cyclic component superimposed on the rotary component.

11. A method according to claim 10, wherein said further cyclic component comprises one or more of an orbital, to and fro arcuate, and to and fro linear movement.

12. A method according to claim 6, wherein the step of generating heat at said interface between said member and said disc brake comprises imparting a cyclic motion to said consumable member.

13. A method according to claim 12, wherein said cyclic motion includes a rotary component.

14. A method according to claim 13, wherein said cyclic motion includes a further cyclic component superimposed on the rotary component.

15. A method according to claim 14, wherein said further cyclic component comprises one or more of an orbital, to and fro arcuate, and to and fro linear movement.

16. A method of providing a material surface on a substrate, the method comprising applying a consumable member to said substrate under pressure; moving said member and said substrate relative to one another along a path and generating heat at the interface between said member and said substrate so that material is laid down on said substrate along said path, wherein said step of generating heat at said interface between said member and said substrate comprises imparting a cyclic motion to said consumable member, said cyclic motion including a rotary component and a further cyclic component superimposed on said rotary component.

17. A method according to claim 16, wherein said further cyclic component comprises one or more of an orbital, to and fro arcuate, and to and fro linear movement.

18. A method according to claim 1, wherein a recess is provided along said path and into which said material is laid down.

19. A method according to claim 1, wherein said consumable material member comprises a cobalt based or nickel based alloy, an iron based alloy containing tungsten, manganese and/or molybdenum.

20. A method according to claim 1, wherein said substrate comprises cast-steel, wrought steel, aluminium, or stainless steel.

21. A method according to claim 1, wherein said substrate comprises a material having a specific gravity of less than 5 gm/cc.

22. A brake disc which has been manufactured by a method according to claim 1.

23. A method according to claim 6, wherein a recess is provided along said path and into which said material is laid down.

24. A method according to claim 6, wherein said consumable material member comprises a cobalt based or nickel based alloy, an iron based alloy containing tungsten, manganese and/or molybdenum.

25. A method according to claim 6, wherein said disc brake comprises cast-steel, wrought steel, aluminium, or stainless steel.

26. A method according to claim 6, wherein said disc brake comprises a material having a specific gravity of less than 5 gm/cc.

27. A method according to claim 16, wherein a recess is provided along said path and into which said material is laid down.

28. A method according to claim 16, wherein said consumable material member comprises a cobalt based or nickel based alloy, an iron based alloy containing tungsten, manganese and/or molybdenum.

29. A method according to claim 16, wherein said substrate comprises cast-steel, wrought steel, aluminium, or stainless steel.

30. A method according to claim 16, wherein said substrate comprises a material having a specific gravity of less than 5 gm/cc.

31. A brake disc which has been manufactured by a method according to claim 16.

32. A method according to claim 1, wherein said material is a wear resistant material.

33. A method according to claim 6, wherein said material is a wear resistant material.

34. A method according to claim 16, wherein said material is a wear resistant material.

* * * * *